United States Patent
Danzig et al.

(10) Patent No.: US 12,552,093 B2
(45) Date of Patent: Feb. 17, 2026

(54) METHOD AND DEVICE FOR METERING BUILDING MATERIAL IN A GENERATIVE PRODUCTION METHOD

(71) Applicant: EOS GmbH Electro Optical Systems, Krailling (DE)

(72) Inventors: André Danzig, Lindenberg (DE); Rainer Salzberger, Buch am Erlbach (DE); Jochen Philippi, Gräfelfing (DE); Andreas Baumann, Gräfelfing (DE); Gerd Cantzler, Neuried (DE); Robert Jelin, Wielenbach (DE)

(73) Assignee: EOS GmbH Electro Optical Systems, Krailling (DE)

( * ) Notice: Subject to any disclaimer, the term of this patent is extended or adjusted under 35 U.S.C. 154(b) by 676 days.

(21) Appl. No.: 17/745,286

(22) Filed: May 16, 2022

(65) Prior Publication Data

US 2022/0274323 A1    Sep. 1, 2022

Related U.S. Application Data

(62) Division of application No. 15/737,353, filed as application No. PCT/EP2016/066336 on Jul. 8, 2016, now Pat. No. 11,364,678.

(30) Foreign Application Priority Data

Jul. 13, 2015  (DE) .......................... 102015213106.8

(51) Int. Cl.
  *B29C 64/153*   (2017.01)
  *B22F 10/28*    (2021.01)
  (Continued)

(52) U.S. Cl.
  CPC ............ *B29C 64/153* (2017.08); *B22F 10/28* (2021.01); *B22F 10/37* (2021.01); *B22F 12/55* (2021.01);
  (Continued)

(58) Field of Classification Search
  CPC ... B29C 64/153; B29C 64/321; B29C 64/343; B29C 64/393; B29C 64/307;
  (Continued)

(56) References Cited

U.S. PATENT DOCUMENTS 5,252,264 A * 10/1993 Forderhase ........... B22F 12/224
                                                         156/272.8
6,165,406 A    12/2000 Jang et al.
(Continued)

FOREIGN PATENT DOCUMENTS

CN         1334158        2/2002
CN       101309766       11/2006
(Continued)

OTHER PUBLICATIONS

International Search Report for Application No. PCT/EP2016/066336, dated Jul. 6, 2017, 5 pages.
(Continued)

*Primary Examiner* — Jeffrey M Wollschlager
(74) *Attorney, Agent, or Firm* — Polsinelli PC

(57) ABSTRACT

A method of manufacturing an object in a build area by successive layer-by-layer solidification of a building material in powder form.
The method includes applying a layer of the building material in powder form having a predetermined thickness onto a layer of the building material already previously applied which has been solidified in a region corresponding to a cross section of the object A recoater is moved in a direction across the layer already previously applied, and the building material is solidified in a shape corresponding to a cross section of the object.
Prior to the application of a layer, for a solidified region having a thickness d1 in the layer applied before, the maximum of the product of the extension of this region
(Continued)

in movement direction of the recoater and the thickness d1 is determined and during the application of the layer, at least an additional powder amount proportional to the value of the maximum is additionally provided.

19 Claims, 12 Drawing Sheets

(51) Int. Cl.
    *B22F 10/37*     (2021.01)
    *B22F 12/55*     (2021.01)
    *B22F 12/57*     (2021.01)
    *B22F 12/67*     (2021.01)
    *B29C 64/165*     (2017.01)
    *B29C 64/343*     (2017.01)
    *B29C 64/393*     (2017.01)
    *B33Y 10/00*     (2015.01)
    *B33Y 30/00*     (2015.01)
    *B33Y 50/02*     (2015.01)

(52) U.S. Cl.
    CPC .............. *B22F 12/57* (2021.01); *B22F 12/67* (2021.01); *B29C 64/343* (2017.08); *B29C 64/393* (2017.08); *B33Y 10/00* (2014.12); *B33Y 30/00* (2014.12); *B33Y 50/02* (2014.12); *B22F 2999/00* (2013.01); *B29C 64/165* (2017.08); *Y02P 10/25* (2015.11)

(58) Field of Classification Search
    CPC ... B29C 64/165; B29C 64/205; B29C 64/386; B22F 10/28; B22F 10/37; B22F 12/55; B22F 12/57; B22F 12/67; B22F 2999/00; B22F 2998/10; B22F 3/10; B33Y 10/00; B33Y 30/00; B33Y 50/02; Y02P 10/25; B01J 4/02
    See application file for complete search history.

(56) References Cited

U.S. PATENT DOCUMENTS

| | | | |
|---|---|---|---|
| 6,259,962 B1 | 7/2001 | Gothait | |
| 6,672,343 B1 | 1/2004 | Perret et al. | |
| 6,682,688 B1 | 1/2004 | Higashi et al. | |
| 6,896,839 B2 * | 5/2005 | Kubo | B29C 64/165 264/109 |
| 2004/0170765 A1 * | 9/2004 | Ederer | B05D 1/42 118/256 |
| 2004/0228754 A1 * | 11/2004 | Abe | B22F 3/004 419/6 |
| 2006/0145381 A1 | 7/2006 | Larsson | |
| 2009/0121393 A1 | 5/2009 | Satoshi | |
| 2010/0121476 A1 * | 5/2010 | Kritchman | B29C 64/112 264/401 |
| 2011/0287185 A1 * | 11/2011 | Felstead | B22F 3/105 118/58 |
| 2015/0202826 A1 | 7/2015 | Paternoster et al. | |
| 2016/0339639 A1 | 11/2016 | Chivel | |
| 2017/0021569 A1 * | 1/2017 | Puigardeu Aramendia | B29C 64/205 |
| 2017/0057013 A1 | 3/2017 | Gillespie et al. | |

FOREIGN PATENT DOCUMENTS

| | | |
|---|---|---|
| CN | 100453218 | 1/2009 |
| DE | 19530295 | 1/1997 |
| DE | 102007006478 | 8/2008 |
| DE | 102011121568 | 6/2013 |
| DE | 102012012471 | 9/2013 |
| EP | 1099534 | 5/2001 |
| JP | 2003502500 | 1/2003 |
| JP | 2008068439 | 3/2008 |
| RU | 2013152082 | 5/2015 |
| WO | 2008120183 | 9/2008 |
| WO | 2014012764 | 1/2014 |
| WO | WO2014125281 * | 8/2014 |
| WO | 2015073301 | 5/2015 |
| WO | 2015187422 | 12/2015 |

OTHER PUBLICATIONS

Paternoster, Stefan, English translation of WO2014012764, Jan. 23, 2014 (Year: 2014).

* cited by examiner

METHOD AND DEVICE FOR METERING BUILDING MATERIAL IN A GENERATIVE PRODUCTION METHOD

TECHNICAL FIELD OF THE INVENTION

The present application relates to a method and a manufacturing device for generative layer-by-layer manufacturing of three-dimensional objects as well as to a correspondingly adapted metering device. In particular, the present invention relates to devices and methods in which the building material is in powder form.

BACKGROUND OF THE INVENTION

In a method of generative layer-by-layer manufacturing of three-dimensional objects, typically, a building material layer is applied on a height-adjustable support and selectively solidified in a building chamber. This process is continued by repeatedly applying and solidifying layers as long as the three-dimensional object is completed by the selective solidification of the layers stacked on top of each other.

DE 10 2011 121 568 A1 describes a generative layer manufacturing method in which a metal material in powder form is selectively solidified by means of electromagnetic radiation or electron beam radiation. In particular, DE 10 2011 121 568 A1 addresses the problem that the powder application is normally always carried out across the total area of the given building chamber. This, firstly, leads to a prolonged manufacturing time since a large-area layer is applied even if only a small fraction of this layer is actually solidified. There is, further, also the disadvantage that large amounts of powder are used although only a fraction of the powder is actually solidified.

A high powder consumption is disadvantageous for several reasons. If one for a moment disregards the high building material costs caused thereby, then there is also the disadvantage that further resources, for example the powder handling systems (sieves, conveying systems), are subjected to an increased wear due to the more frequent use. Particularly when very tall objects are built, the building time may be prolonged by powder refill procedures becoming necessary. At worst, the overall height of the objects to be manufactured is limited if a powder refill procedure is inexpedient. A reuse of non-solidified powder which has already been used in a device for a generative layer-by-layer manufacture once, is possible only to a limited extent since the powder ages in the device.

To solve the mentioned problems, DE 10 2011 121 568 A1 proposes to build up, within the building chamber, a building cell closely encompassing the object to be built. Simultaneously, the recoater is laterally confined, so that only the region within the building cell is coated. In particular, the wall of the building cell is successively built up by selective solidification from the building material used for the building process. This makes it possible to vary the lateral position of the building cell wall from layer to layer and to adapt it to the respective cross section of the object in a layer.

Even if the method described in DE 10 2011 121 568 A1 may certainly lead to a saving of powder, the provision of additional walls made of the solidified building material results in that the unpacking procedure for the completed objects (getting the objects free from the non-solidified powder surrounding them) is complicated. Therefore, the object of the present invention is to provide a method and a device which allow an alternative optimization of the powder metering without a necessary acceptance of the provision of confining walls made of the building material, which do not belong to the object.

SUMMARY OF THE INVENTION

The object is solved by a method according to claim 1, a metering device according to claim 7, a manufacturing device according to claim 11, and a computer program according to claim 14. Further developments of the invention are described in the dependent claims.

Features and the usefulness of the invention will be described in the following on the basis of exemplary embodiments with reference to the drawings.

DETAILED DESCRIPTION OF THE EMBODIMENTS

First Embodiment

Figure 1:
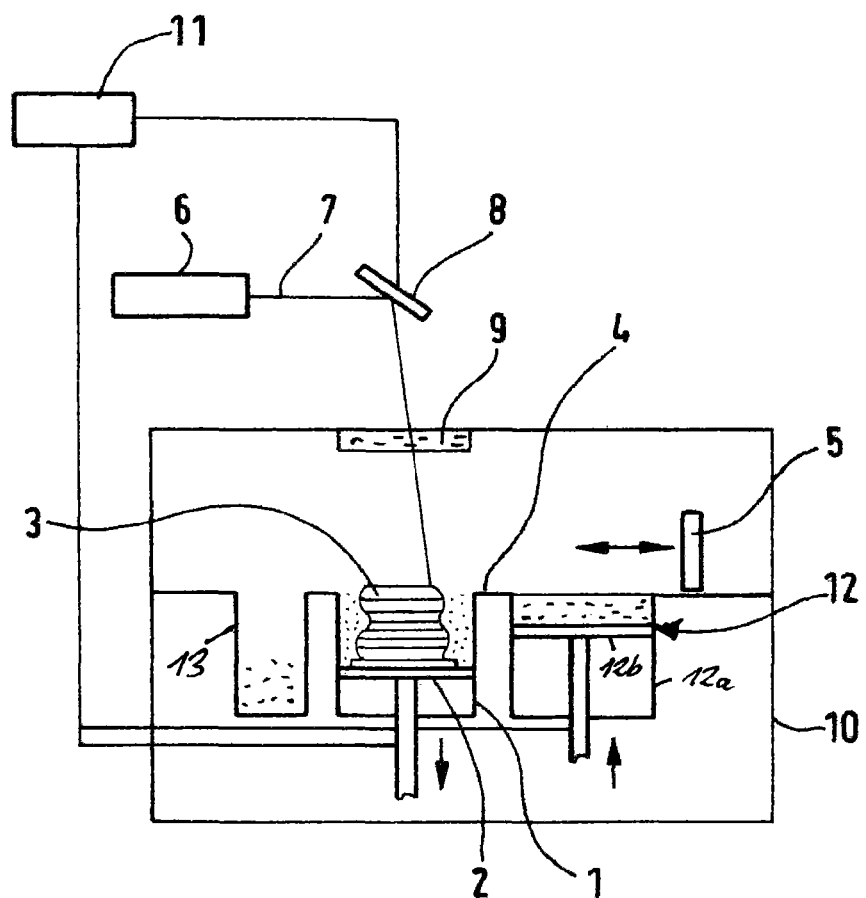
FIG. 1 is a representation of a device according to the invention for executing a generative layer manufacturing method.

To begin with, a generative manufacturing device suitable for executing the method of the present invention is described. FIG. 1 shows in a schematic manner a laser sintering or, respectively, melting device as an example of such a device for the layer-by-layer manufacturing of a three-dimensional object by means of a generative manufacturing method. The device comprises a building container 1 open to the top, to which the building material for the layer-by-layer manufacturing process is fed and which laterally encompasses the building material during the layerby-layer manufacturing process. A support 2 movable in a vertical direction carries a building platform which, in turn, carries the object 3 to be formed. Optionally, the building platform may also be omitted. By the horizontal dimensions of the building container 1, a build area 22 (see FIG. 2) is defined. The latter may, however, also be reduced in size by analogy to DE 10 2011 121 568 A1. The support 2 is adjusted in height such that the layer of the object 3 respectively to be solidified lies in a building plane 4. Further, a recoater 5 is provided for applying the building material in powder form solidifiable by electromagnetic radiation or particle radiation onto layers of the object 3 which are already solidified or, at the beginning of the building process, onto the building platform itself. An irradiation system shown in FIG. 1 used for the powder solidification comprises a laser 6 as a source of the electromagnetic radiation. A further part of the irradiation system is a deflecting device 8 by which a laser beam 7 generated by means of the laser 6 is directed onto a coupling window 9 from which the beam enters the process chamber 10 and hits a predetermined point in the building plane 4. The process chamber 10 is preferably floodable with a protection gas in order to prevent reactions of the powder with the environmental atmosphere.

The device further comprises a control unit 11 via which the deflecting device 8, the vertical movement of the support 2, the recoater 5, and a vertically movable (feeding) plunger 12b in a metering (or dosing) container 12a are controlled in a coordinated manner for executing the building process. As the case may be, the control unit 11 may also control yet further parts of the device. In particular, the control unit 11 has access to CAD data of the object to be manufactured, which serve as a basis for the control.

As a building material in powder form, any powders or, respectively, powder mixtures suitable for a generative layer manufacturing method, in particular for a laser sintering or melting method, can be employed. In particular, this includes metal powder, e.g. stainless steel powder. Beyond that, the method according to the invention is similarly applicable when plastic powder or ceramic powder or, respectively, plastic-coated sand is used.

The operation of the laser sintering device is carried out in such a manner that the recoater 5 moves across the build area and applies a powder layer having a predetermined thickness d2. Subsequently, the cross section of the object 3 in the respective layer is irradiated by the laser beam 7, whereupon the powder at least partly melts on and solidifies during the subsequent cooling. By saying "at least partly melts on", it is meant that the powder particles melt on at least merely superficially, however, if desired also completely. Also a mere softening of the powder grains likewise leading to a connection of the same to a solid body during the subsequent cooling would be possible. After this, the support is lowered by an amount d2 and a new powder layer having a thickness d2 is applied. The manufacturing of the object 3 is carried out in this manner layer by layer. After completion, the object 3 is removed and, as the case may be, post-treated and/or subjected to a quality control.

As shown in FIG. 1, the building material in powder form that is provided for an application process is arranged in a metering container 12a beside the building container 1. By lifting the plunger 12b in the metering container 12a, powder material is pushed upwards, which can then be pushed to the build area and distributed there by the recoater 5. In the course of this, the provided powder amount is controllable via the height difference $S_D$ by which the plunger 12b is moved upwards in the metering container 12a. In other words, the plunger 12b and the metering container 12a cooperate as a metering device 12 for measuring the powder amount to be used for a layer application.

Figure 2:
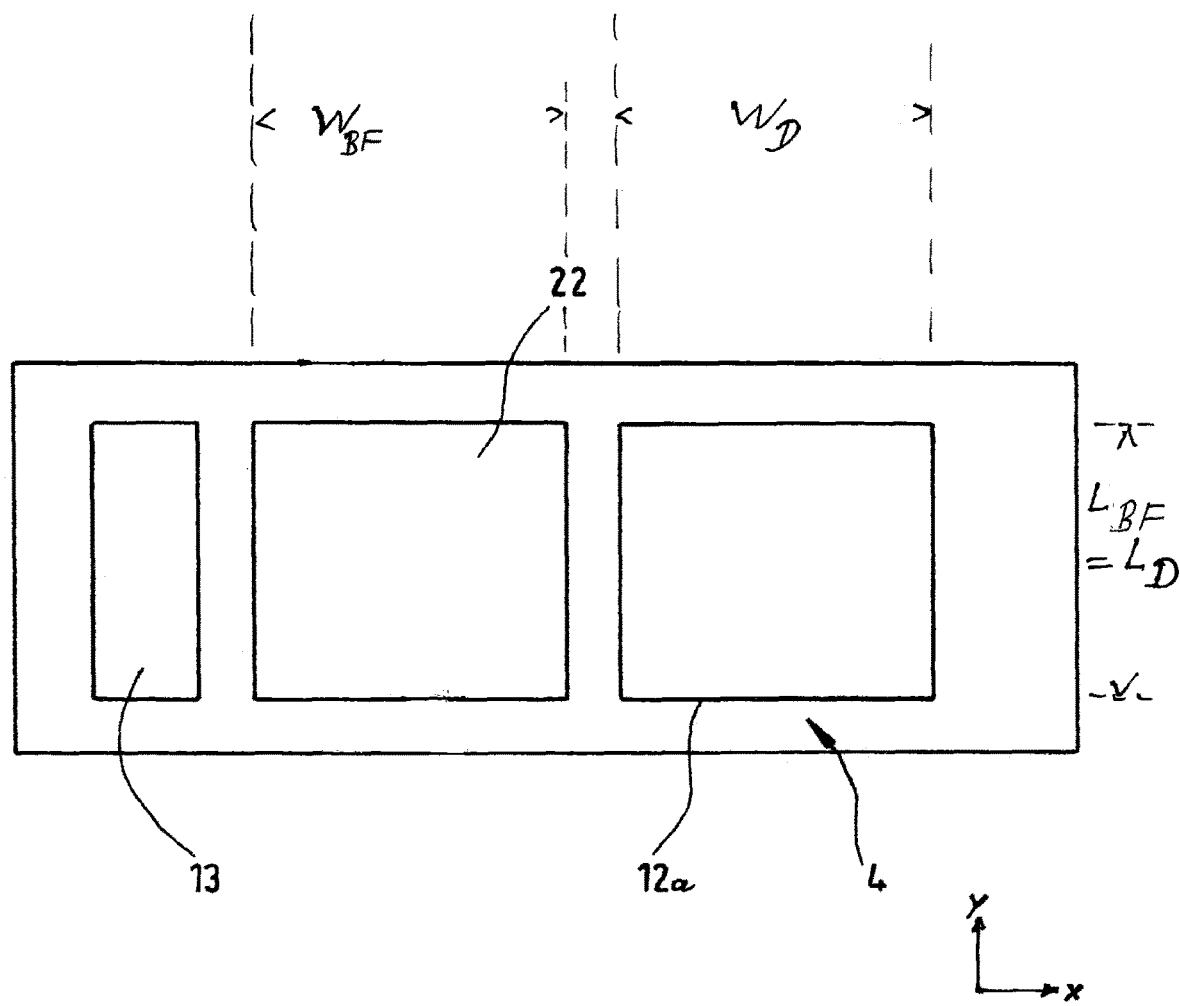
FIG. 2 is a top view of the building plane of the device schematically represented in FIG. 1.

FIG. 2 shows a top view of the building plane 4 of the device in FIG. 1. Beside the build area 22, one recognizes the metering container 12a and an overflow container provided with the reference sign 13, into which excess building material is pushed after a layer application by the recoater 5 not shown in FIG. 2. Thus, the recoater 5 would move from the right to the left in FIG. 2.

In FIG. 2, a length $L_D$ and width $W_D$ of the metering container 12a or, respectively, feeding plunger 12b are equal to the length $L_{BF}$ or, respectively, width $W_{BF}$ of the build area 22. Even though this does not necessarily need to be so, it, however, at least makes sense if the length $L_D$ of the metering container is equal to the length $L_{BF}$ of the build area since, otherwise, powder is possibly pushed by the recoater 5 beside the build area. As already mentioned, the recoater 5 is moved in FIG. 2 in a direction of the width $W_{BF}$ of the build area 22.

If the powder amount P1 is to be provided for applying a layer having the thickness d2, then, in a first approximation, the plunger in the metering container has to be moved upwards by the distance $S_D = d2*(W_{BF}*L_{BF})/(W_D*L_D)$ for this purpose.

Figure 3:
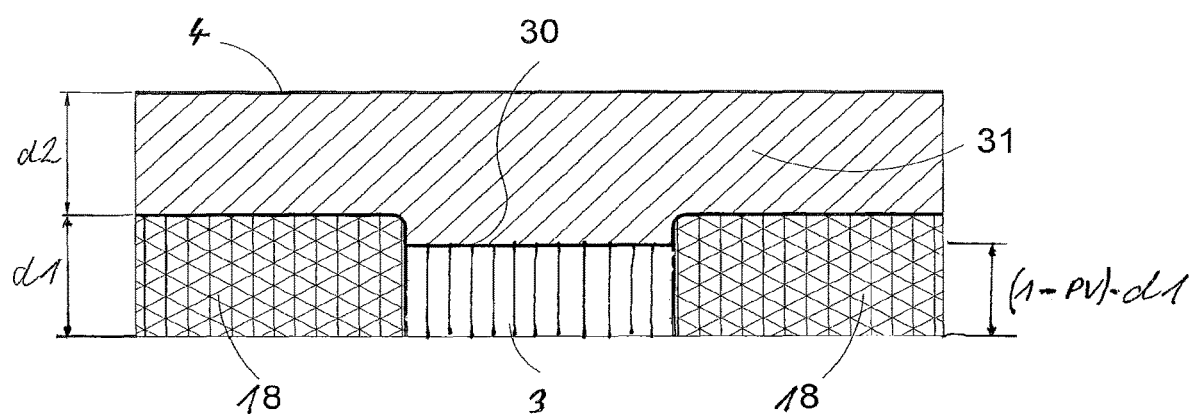
FIG. 3 shows a cross-sectional side view of the object to be manufactured, at a height of the building plane during the manufacturing process.

The present invention takes into account that the powder amount needed for manufacturing an object cross section does not only depend on the predetermined thickness d2 with which a powder layer is applied. This is visualised with reference to FIG. 3:

FIG. 3 shows a side view of the object 3 during the building process. In detail, the currently top layer of the object 3 is shown which is already solidified and is flanked on the left and on the right by non-solidified building material 18 in powder form, which is briefly denoted as "powder material" hereinafter. In the state shown in FIG. 3, a new powder material layer 31 is already applied by means of the recoater 5 onto the preceding layer solidified in the region of the object 3, i.e. the application process is already finished.

As one clearly recognizes in FIG. 3, the surface of the object 3 lies below that of the powder 18 remaining non-solidified, so that a sinking 30 is formed at this position. The reason for this is the material compaction due to the powder melting-on or, respectively, softening process already mentioned further above.

As one also recognizes in FIG. 3, more powder has to be applied in the region of the sinking 30. At this position, the thickness of the new powder layer 31 is equal to d2+d1*PV. Here, the quantity d1 is intended to denote the thickness of the preceding powder layer before it is solidified. The powder compaction factor PV is intended to characterize a percentage by which the thickness of the preceding layer has decreased due to the solidification. It should be also noted that, in a first approximation, one can assume that d1 is equal to d2. However, it could also be that a layer just applied exhibits a thickness slightly different from d2 due to thermal processes or settling processes, even though it was applied having the thickness d2. This is intended to be accounted for by introducing the quantity d1.

Basically, the powder amount P2 additionally needed for compensating the shrinking during the solidification may be simply accounted for in an across-the-board manner by increasing the powder amount P1 required for coating the total build area with an intended thickness d2 by a fixed safety value. In contrast, in the approach applied by the applicant so far, the additional powder amount P2 needed for compensating the shrinking is not selected to be the same for each layer, but is selected according to the requirements:

The additionally needed powder amount P2 depends on the area A of the object cross section solidified last. Therefore, in the approach applied by the applicant so far, the control unit 11 accesses the CAD data of the object to be manufactured before the application of a new powder layer and determines the area A of the solidified region in the powder layer solidified last. Based on this area A, the powder amount additionally needed for the compensation of the shrinking is then provided for the layer application.

Figure 4B:
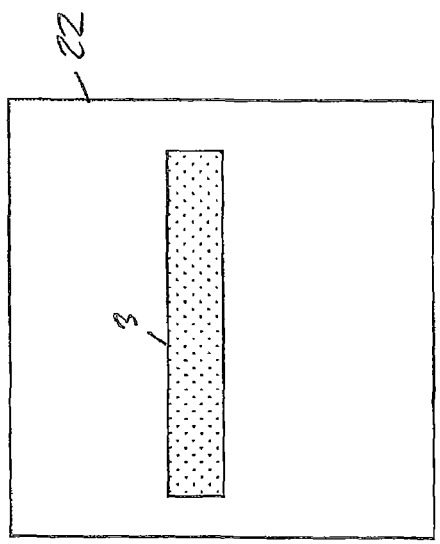
FIGS. 4*a* and 4*b* show top views of the build area to explain a method according to the first embodiment of the invention.
Figure 4A:
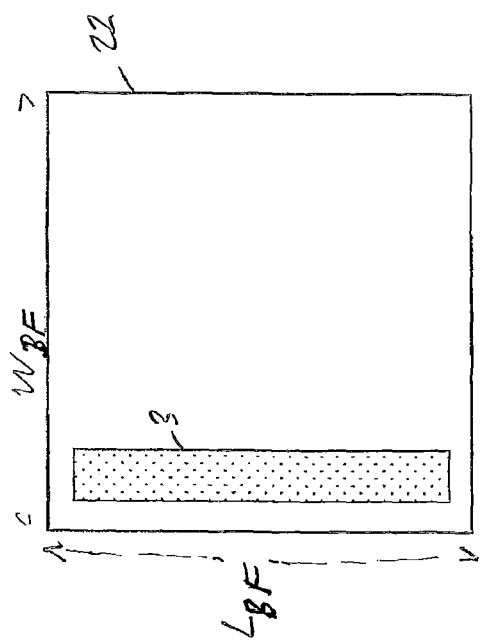

Although an optimization of the powder use is already possible in a process according to the approach applied by the applicant so far, the powder consumption can be even further optimized according to the method according to the first embodiment:

In the course of this, the inventors started from the consideration that the orientation of the last irradiated area in the build area influences the powder amount additionally needed for compensating the powder compaction in the irradiated area. This shall be illustrated by FIGS. 4a and 4b. In both figures, a layer application is carried out on the depicted area of the build area 22 in a horizontal direction, respectively. The cross section of the object 3 solidified in the preceding layer is shown as an elongate rectangle, for the sake of convenience. Although the area of the component's cross section solidified last is the same in FIGS. 4a and 4b, a considerably larger amount of powder is needed with the cross section position as in FIG. 4b for compensating the shrinking due to the powder compaction:

In FIG. 4a, the additionally needed powder amount is filled across the total length $L_{BF}$ of the build area into the cross section region solidified last. In contrast, in FIG. 4b, the additional powder amount is needed not along the total length $L_{BF}$ of the build area, no additional powder amount is needed above and below the object cross section 3 in FIG. 4b. Nevertheless, also in these regions, more powder is applied since the feeding plunger 12b in the metering container 12a can provide the additional powder amount P2 only uniformly along the total length $L_{BF}$ of the build area. Thus, until now, when planning a manufacturing process, it was proceeded in such a manner that the objects were arranged in the building space such that preferably the situation according to FIG. 4a was present. However, not all object geometries allow such an optimisation of the powder consumption.

The method according to the first embodiment of the invention will now be described in detail with reference to FIG. 5:

According to the first embodiment, the control unit 11 proves the position of the object cross section irradiated last within the build area 22. To this end, the control unit 11 carries out a segmentation of the build area into n (n>1) narrow strips 221. In the course of this, the strips 221 extend in an x-direction, i.e. in a direction of the width $W_{BF}$ of the build area 22 or, respectively, in a movement direction of the recoater 5. On the basis of the CAD data of the object to be manufactured, the control unit 11 can, firstly, determine in which strips the object cross section solidified in the preceding powder layer is present. From the CAD data, also the original thickness d1 of the preceding powder layer emerges. Now, in a second step, the control unit 11 determines for each strip 221 in which the object cross section solidified in the preceding powder layer is present the extension $x_i$ of the object cross section in x-direction (the movement direction of the recoater 5) in this strip. For determining the additional powder amount P2 needed for the compensation of the shrinking, the maximum (MAX) of the strip-wise products of extension $x_i$ in the movement direction of the recoater 5 and layer thickness d1 of the preceding powder layer is then used. Since the layer thickness d1 of the preceding powder layer is the same for all strips, it is clear that the product does not have to be separately determined for each strip, but also merely the maximum value xmax of the strip-wise extensions $x_i$ can be determined first and be then multiplied by the layer thickness d1 in order to obtain the maximum (MAX).

The resulting travelling distance $S_D$ for the plunger 12b in the metering container 12a of the device in FIG. 1 is then obtained by the following equation:

$$S_D = [L_{BF} * W_{BF} * (d2 + SF) + L_{BF} * MAX * PV]/(L_D * W_D) \quad (1),$$

wherein d2 is the desired thickness of the layer to be applied, SF is a safety factor by which the powder losses during the application are accounted for, and PV describes the percentage by which the layer thickness of the building material (18) has shrunk during the solidification.

Normally, the length of the feeding plunger $L_D$ will be equal to the length of the build area $L_{BF}$ (extension in a y-direction in FIG. 5), so that the above equation is simplified to $$S_D = [W_{BF} * (d2 + SF) + MAX * PV]/W_D. \quad (2)$$

By the method according to the first embodiment, it is ensured that sufficient powder is applied at all positions of the object cross section solidified last, in order to compensate the shrinking due to the powder compaction. At the same time, the powder consumption is limited to what is absolutely necessary.

In the method described above, the determination of the maximum extension of the last solidified object cross section in x-direction will be the more precise, the smaller the strip width in the segmentation of the build area into strips is. In practice, a compromise will be found since, of course, the number of strips increases with a decreasing strip width and, thus, the time period for determining the maximum extension increases. A value between 1 and 2 centimeter could be an exemplary value for the strip width. Furthermore, alternatively, an approach is also possible in which the maximum extension in x-direction is determined not by means of the described segmentation into strips, but in another manner. Finally, the width of the individual strips need not be the same for all strips. Depending on the object cross section, it may be appropriate to select different widths for at least some of the strips.

Figure 5:
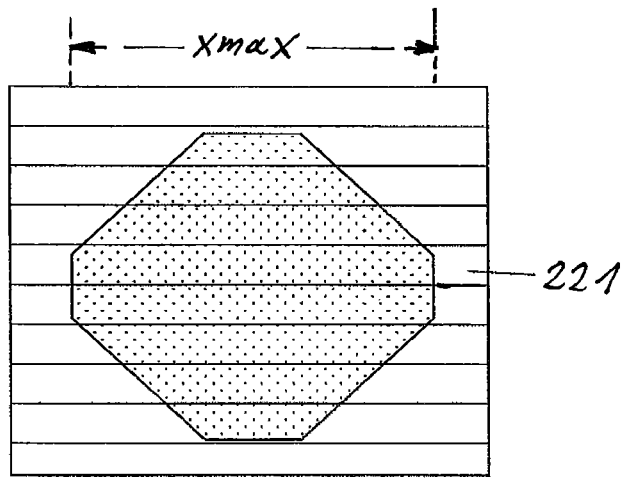
FIG. 5 shows a further top view of the build area to explain the method of the first embodiment.

In FIG. 5, the last solidified object cross section is depicted as one piece. There are certainly also building processes where a plurality of not interconnected object cross sections are solidified in a layer, for instance, if several objects are simultaneously manufactured or if different projections in building direction (z-direction) are present in an object. Here, it is then important to determine and add up the extensions of the individual object cross sections in x-direction. When determining the maximum (MAX) of the products, the maximum value of the strip-wise add-ups is then determined across the extensions of the object cross sections in the movement direction of the recoater (5) and multiplied by the layer thickness d1 since the layer thickness d1 is the same for all solidified regions. Thus, the above equation (1) would have to be modified as follows in such a case:

$$S_D = [L_{PF} * W_{BF} * (d2 + SF) + L_{BF} * maxsum_i * d1 * PV]/(L_D * W_D). \quad (3)$$

In the course of this, $sum_i$ is the sum across the extensions of the individual object cross sections in x-direction within a strip i, and $maxsum_i$ is the maximum value across the strip-wise sums across the extensions. The above-mentioned maximum (MAX) across the strip-wise products would then be equal to MAX=$maxsum_i$*d1.

The safety factor SF is a device-dependent parameter and can be determined by preliminary tests in which the powder loss during the application of a layer is determined. It will be dependent on the actually used manufacturing device. For the sake of clarity, the safety factor is not given in detail in all equations describing the additional powder amount P2.

The value of the powder compaction factor PV is a constant depending on the material and can also be determined in advance after simple preliminary tests for a specific building material, in which the shrinking during the compaction of the building material is investigated under the target solidification conditions (e.g. powder temperature, laser power etc.).

Thus, by the described method, the applied powder amount can be accurately adapted to the needed powder amount, so that powder losses due to an overdosage can be avoided and powder can thus be saved.

Certainly, the described approach is feasible not only in conjunction with the concretely described metering device 12. In cases where the metering device 12 does not use a feeding plunger, but is, for instance, arranged above the building plane 4, it is generally important to determine the volume of the additional powder amount P2 depending on the maximum. By analogy to the above equations (1) and (3), the following equations are then obtained:

$$\text{Volume}(P1)+\text{Volume}(P2)=L_{BF}*W_{BF}*(d2+SF)+L_{BF}*\text{MAX}*PV \quad (1')$$

and $$\text{Volume}(P1)+\text{Volume}(P2)=L_{BF}*W_{BF}*(d2+SF)+L_{BF}*maxsum_i*d1*PV \quad (3').$$

Second Embodiment

Especially in cases of larger components, it happens that different layer thicknesses of the powder are solidified in an object cross section in different regions. This, for instance, applies to the so-called shell-and-core construction:

According to the shell-and-core construction, a solidification is respectively carried out after the application of a powder layer having a specific layer thickness (e.g. 20 μm) in the boundary area (contour region or, respectively, shell region) of an object cross section. The inner area of an object cross section is always solidified only once every m layers, e.g. every three layers, i.e. always only after each m-th layer application. This results in that, in the inner area (core region), a powder layer having a thickness m*d1 is present during the solidification, whereas in the boundary area, a powder layer having a thickness d1 is always present during the solidification process. Due to this, the shrinking during the powder compaction is considerably larger in the core region than in the contour region. If one assumes the value of 20 μm for d1 and starts with the assumption that the core region is solidified every three layers, then a 60 μm thick powder layer is getting compacted in the core region and a 20 μm thick powder layer in the contour region. If one assumes that the above-described powder compaction factor PV has the value 0.5, then one recognises that the shrinking is 30 μm in the core region, whereas the shrinking is only 10 μm in the contour region.

Due to the different shrinking in different regions of an object cross section, the additional powder demand for compensating the shrinking is also different in different regions of the build area. In order to take this fact into account, the above equation (1'), which is newly calculated by the control unit 11 prior to each layer application during the building process, can be slightly modified to:

$$S_D=[L_{BF}*W_{BF}*(d2+SF)+\max_i(x1*d1+x11*d11)*L_{BF}*PV]/(L_D*W_D) \quad (4).$$

Here, an additional powder layer thickness d11 was introduced, wherein, for each strip, the extension x11 of the solidified region having the thickness d11 in x-direction is multiplied by the thickness d11 and the product of the extension x1 of the solidified region having the thickness d1 in x-direction and the thickness d1 is added hereto (the x-direction is the direction of the width $W_{BF}$ of the build area 22). According to the equation (4), subsequently, the maximum value $\max_i$ of the values strip-wise determined in this manner is taken as a basis for the determination of the additional powder amount P2. The maximum value $\max_i$ thus corresponds to the above maximum MAX.

Figure 6:
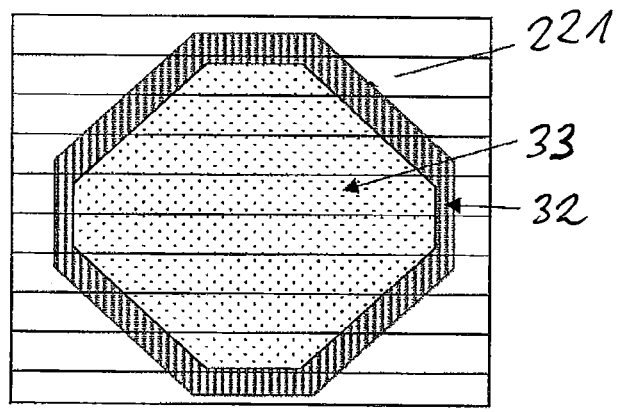
FIG. 6 shows a top view of the build area to explain the method according to the second embodiment of the invention.

In FIG. 6, the procedure is briefly illustrated once again:

In the core region 33, a thickness d11 of the last solidified powder layer is present, and in the hatched contour region 32, a thickness d1 is present. When calculating $S_D$, within each strip in which an object cross section solidified in the preceding powder layer is present, it is summed up across the extensions of the solidified regions 33 and the sum is multiplied by the thickness d11 plus the product of the sum of the extensions of the solidified regions 32 in x-direction and the thickness d1 is added hereto. Subsequently, the maximum value of the values determined strip-wise in such a manner is determined and taken as a basis for the metering of the additional powder amount (the additional powder amount is selected proportionally to this maximum value).

The procedure is, of course, not limited to the presence of only two different layer thicknesses in the last solidified region. For k regions (k>1) having a different layer thickness dj (1≤j≤k), the control unit can more generally determine the travelling distance of the feeding plunger as:

$$S_D=[L_{BF}*W_{BF}*(d2+SF)+\max_i(x1*d1+\ldots xj*dj\ldots xk*dk)*L_{BF}*PV]/(L_D*W_D) \quad (5).$$

If the metering device 12 does not use a feeding plunger, the powder amounts P1 and P2 are determined by the control unit 11 as follows by analogy to the above equations (4) and (5):

$$\text{Volume}(P1)+\text{Volume}(P2)=L_{BF}*W_{BF}*(d2+SF)+\max_i(x1*d1+x11*d11)*L_{BF}*PV \quad (4')$$

and $$\text{Volume}(P1)+\text{Volume}(P2)=L_{BF}*W_{BF}*(d2+SF)+\max_i(x1*d1+\ldots+xj*dj+\ldots+xk*dk)*L_{BF}*PV] \quad (5')$$

Again, $\max_i$ is the maximum of the values determined for all strips in which an object cross section is present. Although one may consider all n strips of the segmentation into strips for the calculations in this application, it is advantageous to take only those strips in which an object cross section is actually present as a basis of the calculation.

If, finally, several solidified regions having the same thickness are possible in a strip of the segmentation into strips, then the equations (5) and (5') can still be modified by analogy to equation (3) to $$S_D=[L_{BF}*W_{BF}*(d2+SF)+\max_i(sumx1*d1+\ldots+sumxj*dj+\ldots+sumxk*dk)*L_{BF}*PV]/(L_D*W_D) \quad (6)$$

or, respectively, $$\text{Volume}(P1)+\text{Volume}(P2)=L_{BF}*W_{BF}*(d2+SF)+\max_i \\ (\text{sum}x1*d1+\ldots+\text{sum}xj*dj+\ldots+\text{sum}xk*dk)* \\ L_{BF}*PV] \quad (6').$$

In the course of this, sumx1 is the sum across all extensions in x-direction of the solidified regions having the thickness d1 present within a strip, sumxj is the sum across all extensions in x-direction of the solidified regions having the thickness dj present within a strip, and sumxk is the sum across all extensions in x-direction of the solidified regions having the thickness dk present within a strip.

Finally, it should be noted that also the above equations (6) and (6') are applicable to the case where only two regions having a different layer thickness are present.

As well as in the first embodiment, so also in the second embodiment the length of the metering device $L_D$ is preferably equal to the length of the build area $L_{BF}$.

Third Embodiment

According to the third embodiment, the metering device 12 shown in the device of FIG. 1 is designed in a specific manner, namely such that, in the direction of the width $W_D$ of the metering container 12a, i.e. perpendicularly to the movement direction of the recoater 5, several feeding plungers 12b are arranged adjacently to each other.

Each of the feeding plungers 12b is height-adjustable independently from the other feeding plungers 12b via a height adjustment device. Thereby, the control unit 11 can control the feeding plungers 12b such that they are lifted differently far before to the application of a new layer. This makes it possible to provide along the length $L_{BF}$ of the build area 22, i.e. perpendicularly to the movement direction of the recoater 5, differently large powder amounts for the layer application.

With the described design of the metering device 12, the powder application can be optimised with a particular success:

Before the application of a new powder layer, the control unit 11 determines at which positions in y-direction, i.e. perpendicularly to the movement direction of the recoater, the object cross section solidified last or, respectively, the object cross sections solidified last are located. At these positions, an increased amount of powder can be then provided by the metering device 12 by moving the corresponding feeding plungers 12b by a larger distance upwards.

Of course, the metering device 12 according to the third embodiment can also be combined with the devices for a layer-by-layer generative manufacturing of three-dimensional objects as described in the first and the second embodiment. In particular, also each of the methods described in connection with the first and the second embodiment, including the modification possibilities described there, can also be performed using the metering device 12 described in the third embodiment.

In an advantageous manner, particular strips of the segmentation into strips are allocated to each feeding plunger. In a particularly advantageous further development, exactly one feeding plunger 12b corresponds to each strip of the segmentation into strips, which is performed by the control unit 11. This means, each strip is selected such that it corresponds to a feeding plunger in the direction of the width $W_{BF}$ of the build area, wherein its width is equal to the width of the feeding plunger. In this case, (exactly) the needed powder amount can be fed to each strip, which was determined taking into account the extension of the last solidified object cross section in the direction of the width of the build area 22 within this strip.

Each of the feeding plungers 12b is then lifted by a distance determined on the basis of the maximum value of the needed powder volume in the strips (possibly, even only one) "allocated" to this feeding plunger 12b. Thus, one obtains for the travelling distance $S_D$ of one of the feeding plungers 12b by analogy to the equation (1) (under the simplifying assumption that exactly one strip is allocated to each plunger):

$$S_D=[W_{BF}*(d2+SF)+\text{MAX}*PV]/(W_D) \quad (1''').$$

It should be observed that the maximum MAX is formed not across all strips, but only pertaining to the strips "allocated" to a feeding plunger 12b.

For the cases covered by the above equations (3) to (5), one obtains for the travelling distance of each plunger by analogy to these equations:

$$S_D=[W_{BF}*(d2+SF)+\text{sum}_i*d1*PV]/(W_D) \quad (3'''),$$

$$S_D=[W_{BF}*(d2+SF)+(x1_i*d1+x11_i*d11)*PV]/(W_D) \quad (4'''),$$

and $$S_D=[W_{BF}*(d2+SF)+(x1_i*d1+\ldots+xj_i*dj+\ldots+ \\ xk_1*dk)*PV]/(W_D) \quad (5''')$$

with $x1_i$ and $x11_i$ being equal to the extension of the solidified region having the original thickness d1 or, respectively, d11 in the strip i and $xj_i$ being equal to the extension of the solidified region having the original thickness dj in the strip i.

With the so far described configurations of the third embodiment, the recoater 5 pushes the application powder to the build area 22 after the feeding plungers 12b were lifted in the metering device 12. In order to prevent that the differences in the powder application amount, which were provided by the different feeding plungers 12b, get reduced by a lateral movement (in a longitudinal direction of the build area 22), the recoater 5 may be advantageously provided with separating walls which are walls extending in the movement direction of the recoater 5. Advantageously, separating walls are respectively located exactly at those positions at which two feeding plungers 12b adjoin each other.

Finally, it should still be noted with respect to the third embodiment that the dimensions of the individual plungers perpendicularly to the movement direction of the recoater do not have to be all equal. Correspondingly, also the strip widths $y_i$ in the segmentation into strips do not have to be all equal to each other.

Fourth Embodiment

Figure 7:
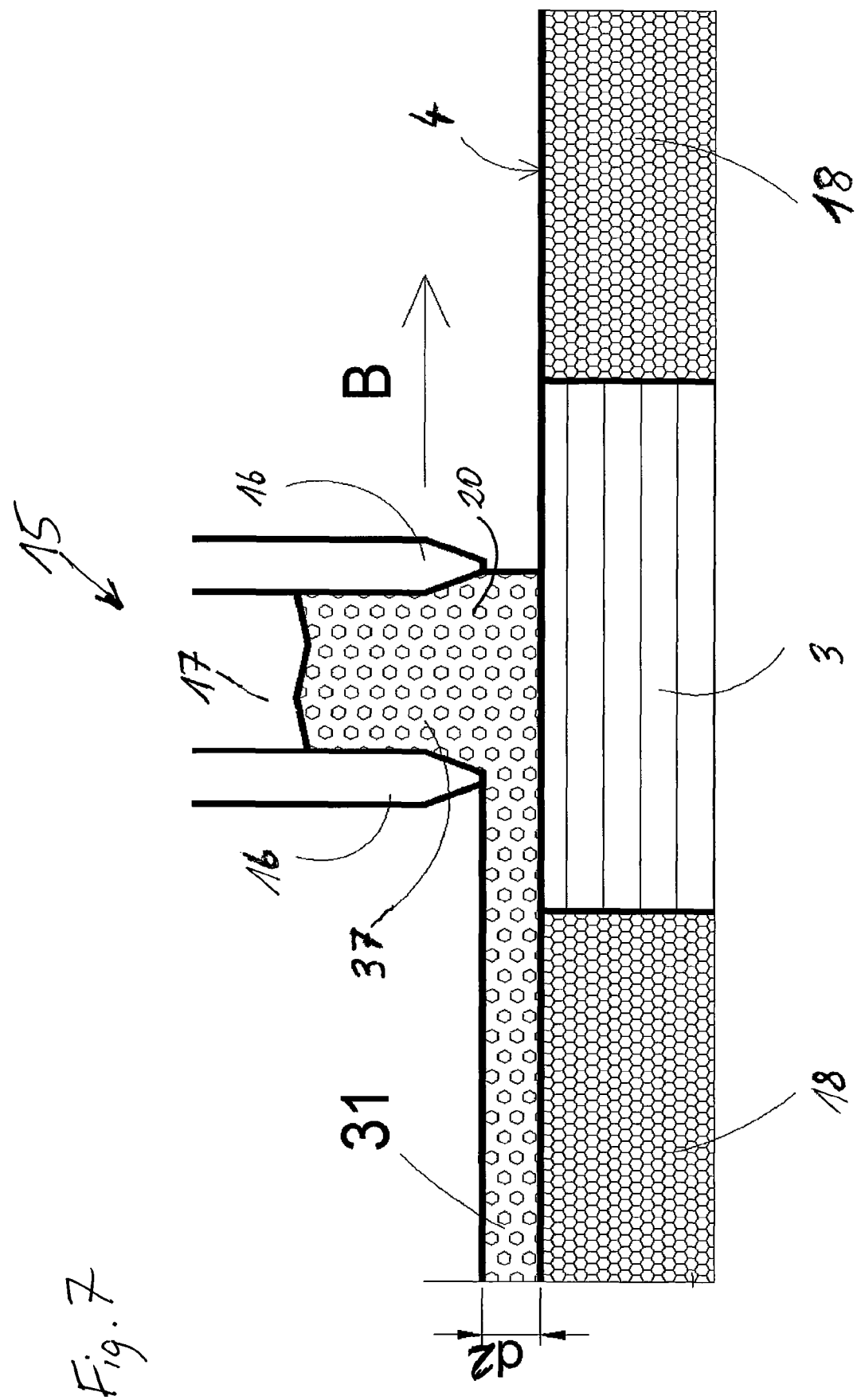
FIG. 7 shows a lateral cross-section with a recoater used in the fourth embodiment.

According to the fourth embodiment, a recoater 15 in which a metering (or dosing) device is already integrated is used in the manufacturing device of FIG. 1 instead of the metering device 12 and instead of the recoater 5. The application principle using such a recoater 15 is described on the basis of FIG. 7, which shows a schematic lateral section through the recoater 15 above the build area 4:

In FIG. 7, a snap-shot during the movement of the recoater 15 across the building plane 4 in the movement direction B is shown. One recognizes in the section view solidified layer regions in the object 3. In the powder 18 remaining non-solidified from preceding layer applications, no layered arrangement is shown. Here, the heights of solidified layer regions and of powder remaining non-solidified are depicted equal for the sake of convenience, although what has been said with regard to, in particular, FIG. 3 also applies here, of course. The recoater 15 substantially consists of two application blades 16 arranged at a distance from each other in movement direction B. The blades 16 extend parallel to each other perpendicularly to the movement direction B, preferably across the total length $L_{BF}$ of the build area, i.e. the length of the recoater $L_D$ perpendicularly to its movement direction is preferably equal to the length $L_{BF}$. Between the blades 16, the recoater 15 comprises a storage space 17 with a powder reserve 37 required for the application of a layer 31. At its lower end, the storage space 17 has an opening 20 through which building material can exit during the movement of the recoater 15, which building material forms a layer having the thickness d2.

Figure 8:
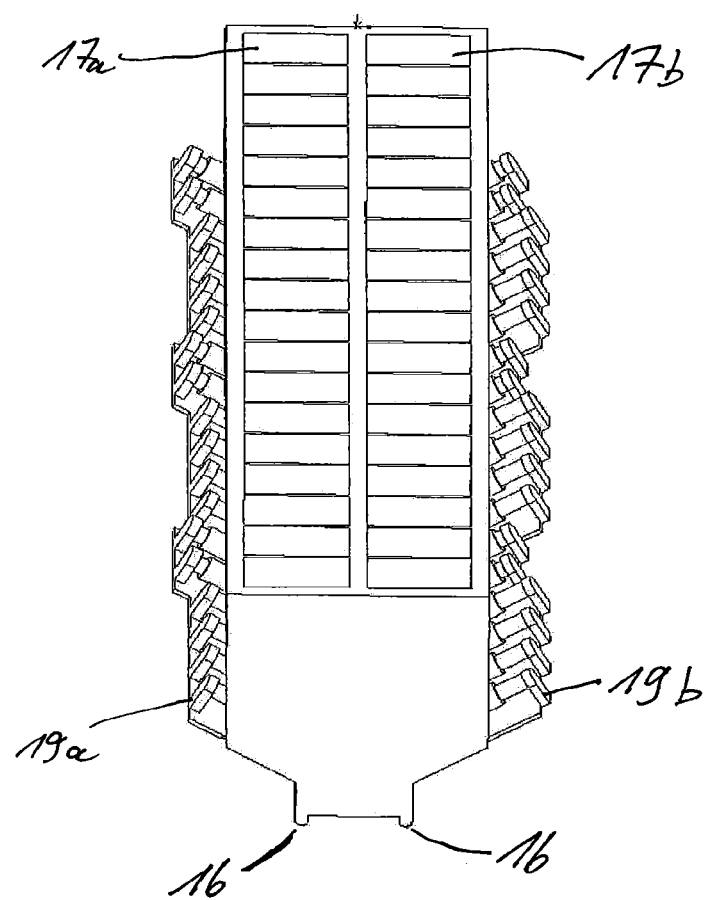
FIG. 8 shows an embodiment of a recoater according to the fourth embodiment of the invention when viewed diagonally from above, i.e. from the same lateral viewing position as in FIG. 7 yet with an elevated location of the observer.

According to the invention, the storage space 17 is subdivided into a plurality of storage chambers 17a, 17b arranged adjacent to one another (or abutting each other) in a direction perpendicular to the movement direction (in FIG. 7, into the drawing plane). FIG. 8 shows, in this regard, an embodiment of a recoater according to the invention when viewed diagonally from above, i.e. from the same lateral viewing position as in FIG. 7, yet with an elevated location of the observer.

In FIG. 8, the recoater comprises a linear arrangement of the storage chambers 17a, 17b in a direction perpendicular to the movement direction of the recoater. It is the special feature of the recoater of FIG. 8 that two storage chambers 17a and 17b are arranged in movement direction of the recoater. However, this does not have to be so in general, and one could also dispense with the subdivision into the chambers 17a and 17b in the movement direction of the recoater.

The recoater 15 having the plurality of storage chambers can thus be seen as a metering device in which the storage chambers arranged in a direction perpendicular to the movement direction of the recoater can be seen as a plurality of powder feeding devices which can independently from each other predefine the amount of the powder material to be applied during the layer application:

By the provision of several storage chambers in a direction perpendicular to the movement direction of the recoater, it is possible to feed different powder amounts at different positions of the build area 22 in the direction perpendicular to the movement direction since the storage chambers can have different filling amounts along the direction perpendicular to the movement direction. Yet thereby, the recoater according to the invention makes a powder saving layer application possible, for instance, in the case depicted in FIG. 4b: Only those storage chambers over-coating the region 3 which has already been solidified during the layer application have to possess an additional powder amount P2 more, by which the shrinking in the solidified region 3 is compensated, in addition to the powder amount P1 for a layer having the thickness d2. Thus, also here it is possible to (substantially) exactly provide the powder demand determined prior to this according to the respective calculation formulas in the respective storage chambers arranged perpendicularly to the application direction, in order to achieve an optimised powder metering based on the powder demand determination carried out before. Further, it would even be possible to apply a new building material layer only in the region of the object 3, but not in other regions of the build area.

Furthermore, sliders 19a, 19b are to see in FIG. 8 by which the openings 20a, 20b at the bottom of the storage chambers 17a and 17b can be closed independently from one another. By these optional closing mechanisms, which are preferably controllable by the control unit 11, a powder discharge from some of the storage chambers can be selectively disabled or, respectively, throttled. Thus, a powder feeding to selected positions of the build area in a direction perpendicular to the movement direction can be stopped in a flexible manner.

Beyond this, it is yet further additionally also possible to turn the powder feeding from some or, respectively, all of the storage chambers on or off during the movement of the recoater. Thereby, an application (i.e. a coating) may be carried out merely in a region of the build area restricted in a direction parallel to the movement direction. Thus, it would be, for instance, possible to apply a powder layer only in the region of the solidified region in FIG. 4a.

Instead of sliders, also all other closing mechanisms by which a powder discharge at the lower end of the storage chambers can be turned (or switched) on and off are suitable. Here, e.g. closable flaps, nozzles, but also a bladed shutter (or an iris) are possible.

In a modification of the metering device according to the invention, the opening degree of the closing devices 19a, 19b is controllable. Hereby, the amount of the powder to be fed to the build area at different positions perpendicularly to the movement direction can be adjusted in a particularly simple manner:

Instead of adjusting the powder amount to be fed by the filling degree in the storage chambers, the powder discharge rate is simply adjusted by the opening degree of the opening at the bottom of a storage chamber.

In a further modification of the fourth embodiment, at least one of the storage chambers is filled with a powder material which is different from the building material 18 in powder form provided in other storage chambers. Thereby, for example, different sections of an object can be manufactured from different building materials.

The specific embodiment of a recoater according to the invention acting as a metering device shown in FIG. 8 is characterized in that there are, respectively, two storage chambers 17a and 17b at a position along the direction perpendicular to the movement direction. The respective second chamber can, firstly, always be filled only at those positions along the direction perpendicular to the movement direction at which a particularly large amount of powder is needed for a powder application. However, the particular advantage of the provision of two (or also more) storage chambers at a position results when the storage chambers 17a, 17b are filled with different materials. In such a case, by the corresponding actuation of the closing devices 19a and 19b, it is adjusted which material is used during the movement of the recoater for the powder application at a position perpendicularly to the movement direction. Thereby, it is possible to adjust the building material to be fed for each arbitrary position of the build area. Whereas, in movement direction of the recoater, the locally accurate adjustment of the powder material to be fed is, in principle, limited by the actuation speed of the closing devices 19a, 19b relatively to the movement velocity of the recoater, in the direction perpendicular to the movement direction, the location accuracy is predefined by the number of the metering chambers 17a, 17b or, respectively, their respective extension perpendicularly to the movement direction. Thus, different materials can be applied locally and in a controlled manner by a corresponding selection of the metering chambers 17a, 17b not only transversally to the application direction, but also in this same direction.

When several storage chambers 17a, 17b, from which powder material can be fed, are provided in movement direction of the recoater, then the accuracy by which the powder is applied from these storage chambers at a specific position in movement direction of the recoater may be adversely affected by the fact that the storage chambers 17a, 17b are seated at different positions in movement direction, as is directly recognisable in FIG. 8: When partly chambers 17a and partly chambers 17b are opened perpendicularly to the movement direction in FIG. 8, then powder from the chambers 17a is deposited at a different position than powder from the chambers 17b (the recoater in FIG. 8 moves either from the left to the right or vice versa). In principle, this effect may also be used in order to simultaneously apply different powders from the storage chambers 17a, 17b for the purpose of the powder mixing with each other; as the case may be, supported by an oscillating movement of the recoater.

Figure 11:
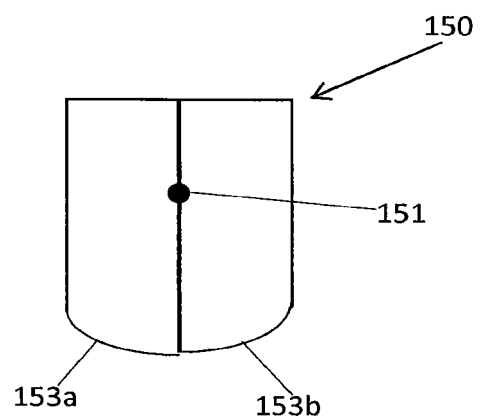
FIG. 11 shows a further variation of the specific modification of FIG. 9 in cross section.
Figure 12:
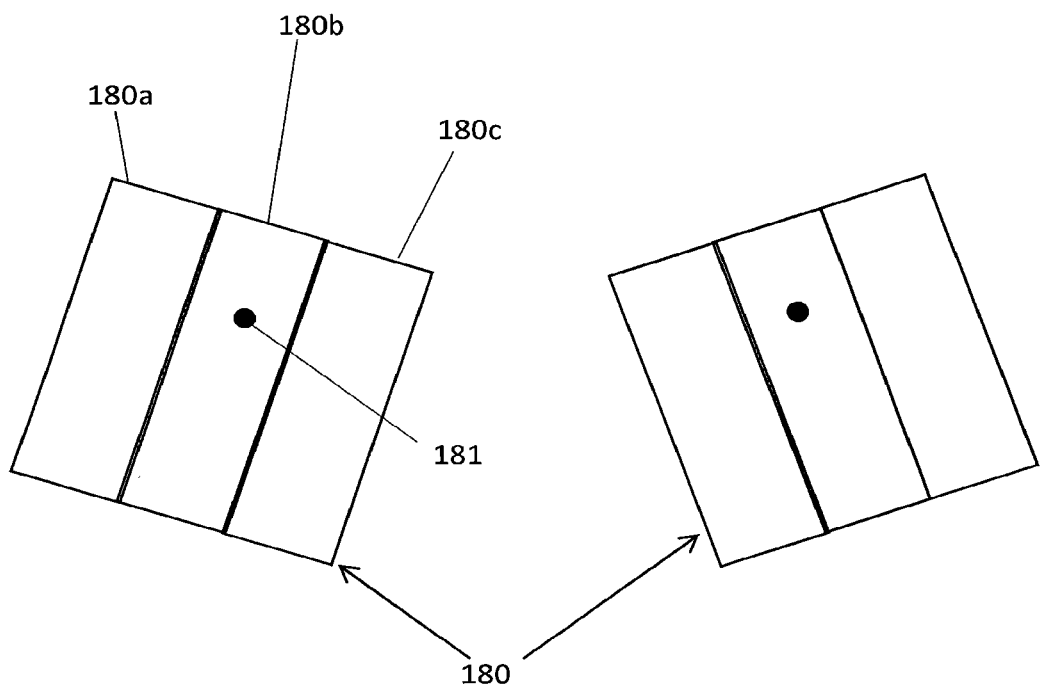
FIG. 12 shows yet another variation of the specific modification of FIG. 9 in cross section.
Figure 13:
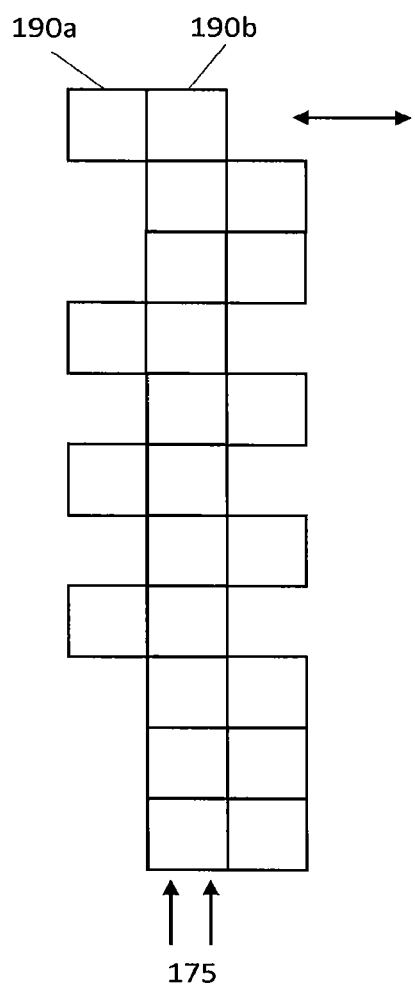
FIG. 13 schematically shows yet another possibility of a specific modification of the powder feeding devices of the recoater of FIG. 8 in the top view.

This problem can be addressed when a specific modification shown in the FIGS. 9 to 12 and a further specific modification shown in FIG. 13 of the recoater of the fourth embodiment shown in FIG. 8 are used. In the course of this, the FIGS. 9 to 12 respectively show lateral cross sections of the specifically modified recoater and FIG. 13 shows a top view of the further specifically modified recoater, wherein the storage chambers 170a, 170b or, respectively, 180a to 180c or, respectively, 190a, 190b successively arranged in movement direction are respectively shown. A plurality of the pairs or, respectively, triples of storage chambers shown in FIGS. 9 to 12 are, thus, arranged in a corresponding recoater 150 or, respectively, 180 side by side perpendicularly to the movement direction (i.e. into the drawing plane). Each of these pairs or, respectively, triples can thus be seen as a powder feeding device already mentioned further above.

In the specifically modified recoater and the further specifically modified recoater, each of the storage chambers 170a, 170b or, respectively, 180a to 180c or, respectively, 190a, 190b is, in particular, provided with a closing device by means of which a powder discharge at the lower end of the storage chambers can be turned (or switched) on and off. Here, again, e.g. closable flaps, sliders, nozzles, but also a bladed shutter (or an iris) are possible as closing devices.

Figure 9:
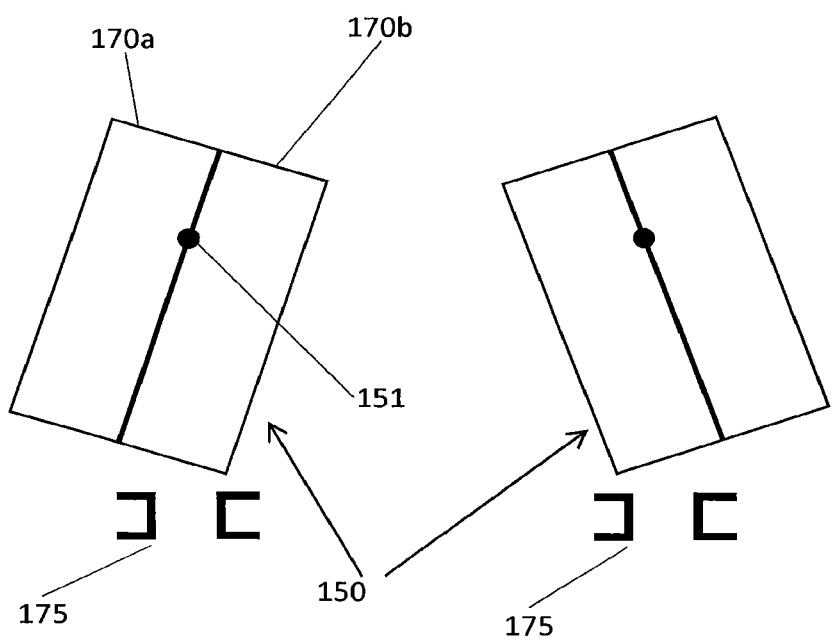
FIG. 9 shows a specific modification of a powder feeding device of the recoater of FIG. 8 in cross section.

The specific feature of the specifically modified recoater is directly gathered from FIG. 9. The pair of storage chambers 170a, 170b shown there can be pivoted or deviated in the recoater 150 via a pivot axis 151 extending perpendicularly to the movement direction of the recoater. Thereby it is possible, e.g. when the powder discharge from the storage chamber 170b is switched to the powder discharge from the storage chamber 170a by correspondingly actuating of the closing devices (not shown), to simultaneously pivot the pair of storage chambers. Whereas, in the left half of the FIG. 9, the outlet of the storage chamber 170b is arranged above the outlet opening 175 arranged below the storage chamber pair, in the right half of the FIG. 9, the storage chamber 170a is arranged above the outlet opening 175 which has a fixed location in the recoater. Thus, in both states of the storage chamber pair shown in FIG. 9, powder reaches the build area through the same outlet opening, so that the relative position with respect to the recoater at which building material exits the recoater does not change by switching from the one storage chamber to the other.

In the recoater, it is possible to provide for each of the provided storage chamber pairs 170a, 170b a separate outlet opening 175 allocated to it. But, just as well, a common outlet opening 175 may also be allocated to several adjacent storage chamber pairs, which then has an elongate shape and extends transversely to the movement direction of the recoater. Specifically, a common outlet opening 175 may also be allocated to all adjacent storage chamber pairs provided in the recoater.

The pivoting of a storage chamber pair about the pivot axis 151 can be accomplished by means of servomotors or, respectively, step motors or, respectively, piezo motors. In the course of this, it may also be provided that several storage chamber pairs are pivoted together which do not necessarily have to be adjacent. In particular, several storage chamber pairs may also be conjointly allocated to one servomotor. The pivot axis may be a shaft extending through several storage chamber pairs, specifically also a shaft extending along the whole recoater, at which the storage chamber pairs are pivot-mounted. However, one could also dispense with such a common shaft, so that the individual storage chamber pairs are respectively provided with their own shaft.

The actuation of the closing devices in the storage chambers and the pivoting may be temporally coordinated with each other by suitably selected control signals. Another option consist in actuating the closing devices by means of the pivoting process, for instance, by means of a mechanical motion-coupling of the pivoting process with a motion of the closing devices and/or by means of a spring-based mechanism.

Figure 10:
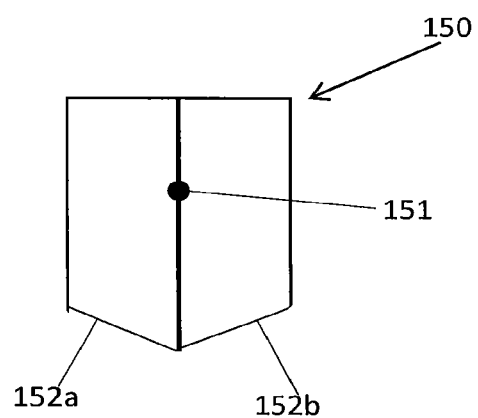
FIG. 10 shows a variation of the specific modification of FIG. 9 in cross section.

FIG. 10 shows a storage chamber pair having modified openings at the bottoms. In FIG. 10, the storage chambers are provided with a bevel 152a, 152b at their bottom. Thereby, in the case of pivoting, the lower edges of the storage chambers are substantially parallel to the working plane 4, in order to make an unhindered powder discharge from the storage chambers into the outlet opening 175 not shown possible.

FIG. 11 also shows a storage chamber pair having modified openings at the bottoms. In FIG. 11, the storage chambers are provided with a rounding 153a, 153b at their bottom. Thereby, in the case of pivoting, the lower edges of the storage chambers are substantially parallel to the working plane 4 for various pivoting positions. Thus, powder can substantially unhamperedly exit also already during the pivoting motion, which makes a speed-up of the powder application possible.

On the basis of the storage chamber triple 180a, 180b, 180c of a recoater 180 shown in FIG. 12 it shall be illustrated that also more than two storage chambers can be successively arranged in movement direction without difficulty. The position of the pivot axis 181 is also here symmetrical to the extension of the storage chamber triple in movement direction. This is very appropriate, but does not necessarily need to be so. In FIG. 12, those pivoting positions are shown, at which powder exits from the storage chamber 180a or, respectively, the storage chamber 180c into a not shown outlet opening 175 in the recoater. In the not shown middle position (when the storage chamber triple is not pivoted), the lower opening of the storage chamber 180b would lie above the outlet opening 175. The modifications of the bottoms of the storage chambers shown in FIGS. 10 and 11 are also applicable to the storage chamber triple shown in FIG. 12 in the same manner. Finally, more generally, it is also possible to successively arrange and, as the case may be, pivot a number n of storage chambers in movement direction in the recoater, wherein n is a natural number. The smaller the dimensions of the storage chambers in movement direction in the recoater, the more of them may be successively arranged.

FIG. 13 shows, as already mentioned, a further specific modification of the recoater of the fourth embodiment. In the course of this, FIG. 13 is a very schematic top view from above onto the recoater. In FIG. 13, one can see pairs of storage chambers 190a, 190b successively arranged in movement direction in the recoater. Similarly as with FIGS. 9 to 12, the storage chamber pairs are, again, moved in such a manner that selectively the one or the other storage chamber is above the schematically depicted position of the outlet opening 175. However, in the specific modification shown in FIG. 13, no pivoting of the storage chamber pairs, but a horizontal shifting in or, respectively, against the movement direction is carried out which, again, can be accomplished by servomotors. Apart from that, all details and modification options which were described in connection with FIGS. 9 to 12 are applicable to the modality of FIG. 13 in the same manner.

It is even possible to combine the modalities of FIGS. 9 to 12 and FIG. 13 with one another, so that the storage chambers are pivoted as well as horizontally shifted in movement direction. Also in this case, all details and modification options which were described in connection with FIGS. 9 to 12 are applicable in the same manner.

The metering device according to the fourth embodiment of the invention can, of course, also be combined with the devices for a layer-by-layer generative manufacturing of three-dimensional objects as they were described in the first and the second embodiment. In particular, also each of the methods described in connection with the first and the second embodiment, including the modification possibilities described there, can be performed using the metering device according to the fourth embodiment of the invention.

In particular if the control unit 11 performs a strip-wise segmentation of the CAD model of the build area 22 for determining the needed application amount of the building material in powder form, the control unit 11 can separately determine for each strip the powder amount needed for this strip taking into account solidification regions already present in this strip in the preceding layer. For a strip width $y_i$, the control unit 11 thus determines, in a modification of equation (1'), a needed powder volume for each strip i $$\text{Volume}(P1)_i + \text{Volume}(P2)_i = y_i * W_{BF} * (d2+SF) + y_i * MAX*PV \quad (1''),$$

wherein MAX is the product of layer thickness d1 of the solidified region in this strip and the extension $x_i$ of the solidified region in this strip in movement direction. By analogy to equations (3'), (4'), and (5'), one obtains $$\text{Volume}(P1)_i + \text{Volume}(P2)_i = y_i * W_{BF} * (d2+SF) + y_i * \text{sum}_i * d1 * PV \quad (3'')$$

$$\text{Volume}(P1)_i + \text{Volume}(P2)_i = y_i * W_{BF} * (d2+SF) + y_i * (x1_i * d1 + x11_i * d11) * PV \quad (4'')$$

or, respectively, $$\text{Volume}(P1)_i + \text{Volume}(P2)_i = y_i * W_{BF} * (d2+SF) * PV * (x1_i * d1 + \ldots + xj_i * dj + \ldots + xk_i * dk)] \quad (5'')$$

with $x1_i$ and $x11_i$ being equal to the extension of the solidified region having the original thickness d1 or, respectively, d11 in the strip i and $xj_i$ being equal to the extension of the solidified region having the original thickness dj in the strip i.

If, at the same time, exactly one storage chamber 17a, 17b corresponds to each strip of the segmentation into strips performed by the control unit 11, then exactly that additional powder amount P2 can be fed to each strip by the storage chamber 17a, 17b allocated to it which was determined taking into account the extension of the last solidified object cross section in movement direction within this strip.

Finally, it should still be noted with respect to the fourth embodiment that the dimensions of the individual storage chambers perpendicularly to the movement direction do not have to be all equal. Correspondingly, also the strip widths $y_i$ in the segmentation into strips do not have to be all equal to each other. Further, also several strips may be allocated to a storage chamber, wherein the total extension of these strips perpendicularly to the movement direction of the recoater is then preferably equal to the extension of the allocated storage chamber perpendicularly to the movement direction of the recoater.

Further, the fourth embodiment of the invention can also be still modified such that at the left and/or right lateral edge of the build area 22 in FIGS. 1 and 7 a powder metering device is arranged which is subdivided perpendicularly to the movement direction of the recoater in the same manner as the recoater and separately supplies the powder amounts $P1_i$ and $P2_i$ to the individual storage chambers of the recoater.

Furthermore, the recoater 15 may also be provided with only one application blade 16, wherein it is ensured that the powder always arrives from the storage chambers in front of the application blade 16 in movement direction of the recoater.

There is a plurality of possibilities for the shape of the storage chambers in the recoater. A rectangular or quadratic cross section is probably the easiest to accomplish. Also for the dimensions of the storage chambers parallel to the building plane 4 there is a plurality of possibilities. The smaller the dimensions are, the higher the accuracy during the powder application will be. It is thus possible e.g. to set the maximum diameter of the storage chambers parallel to the building plane 4 to be at least 0.2 mm, preferably at least 0.5 mm, particularly preferably at least 1 mm and/or at most 10 mm, preferably at most 5 mm, particularly preferably at most 2 mm.

Even though the present invention has been described in all embodiments on the basis of a laser sintering device, it is not limited to the laser sintering or laser melting. It may be applied to arbitrary methods for manufacturing a three-dimensional object by a layer-by-layer application and selective solidification of a building material in powder form. So, for instance, instead of a laser an LED (light emitting diode), an LED array, an electron beam, or any other energy or, respectively, radiation source may be used which is suitable for solidifying the building material in powder form. The invention may be applied also to the selective mask sintering, where a mask and an extended light source are used instead of a laser beam, or to the absorption or, respectively, inhibition sintering. Further, also an application in a 3D-printing process is possible, where an adhesive is supplied for selectively solidifying the powder material.

Finally, in all embodiments, the present invention is not limited to a rectangular build area 22 or a recoater moving in a straight line across the build area. In fact, the recoater may also have a curved shape instead of a linear shape and/or be moved across the build area following a curvilinear travelling path. Correspondingly, the strips in the segmentation into strips also do not necessarily have to be straight-lined, although they should have an unchanging strip width. The metering devices of the third and the fourth embodiment also do not necessarily have to be adjacently arranged in a straight line, but the arrangement may be adapted to the shape of the recoater.

As already mentioned further above, the method according to the invention is preferably performed by the control unit 11 in the manufacturing device. In the course of this, the method may be partly or completely implemented by means of hardware components or also alternatively be completely implemented in the form of a computer program which is executed by the control unit 11.

The control unit 11 can further also comprise units spatially separated from the manufacturing device, in particular, a precalculation unit or, respectively, powder demand determination unit determining during operation the additional powder amount needed in total for a layer in a manner according to the invention. Preferably, the powder demand determination unit comprises a layer data input unit, a powder amount determination unit configured such that it determines from data of a partially solidified powder layer having the thickness d1 received via the layer data input unit and the direction information about the movement direction of a recoater (5) in a manufacturing device for manufacturing at least one three-dimensional object (3) by means of a successive layer-by-layer solidification of a building material in powder form received via the layer data input unit the maximum (MAX) of the product of the extension of this solidified region in the partially solidified layer in movement direction (B) of the recoater (5) and the layer thickness d1 and determines an additional powder amount (P2) proportional to the value of the maximum (MAX) for the application of a layer having the thickness d2 subsequent to the partially solidified layer during the manufacturing, and an additional powder amount output unit. The layer data input unit and the additional powder amount output unit are preferably interfaces for receiving or, respectively, outputting data. In the course of this, the layer data input unit accesses e.g. the computer-aided model of the object to be manufactured, which also the control unit 11 or other parts of the control unit 11 access for the manufacturing process. Furthermore, it is possible that the layer data input unit receives information about the last solidified layer from the control unit 11 or other parts of the control unit 11 or manufacturing device. The additional powder amount output unit outputs the data describing the additional powder amount P2 to the control unit 11 or other parts of the manufacturing device. Thereby, at least an additional powder amount proportional to the value of the maximum of the product of the extension of the solidified region of the previously applied layer in movement direction of the recoater and its thickness is thus added to the powder needed for a layer having the thickness d2. Also such a precalculation unit is likewise subject-matter of the present invention and may be further developed (where applicable) according to the above-described other features or, respectively, modifications of the invention.

In the same manner, the invention also comprises a metering method for metering (or dosing) a building material in powder form in a manufacturing device for manufacturing a three-dimensional object by means of a layer-by-layer solidification of the building material in powder form within a build area, which comprises a recoater movable across the build area for the application of a layer of the building material in the build area, in which the building material is metered by several (or a plurality of) powder feeding devices of a metering device adjacently arranged perpendicularly to the movement direction of the recoater.

The invention claimed is:

1. A method of manufacturing at least one three-dimensional object in a build area by a successive layer-by-layer solidification of a building material in powder form, the method comprising:
   a) applying a layer of the building material in powder form having a predetermined thickness onto a previously applied layer of the building material which has been solidified in a region corresponding to at least a part of a cross section of the at least one three-dimensional object, wherein a recoater is moved in a predetermined direction across the previously applied layer to apply the building material;
   b) solidifying the building material in powder form applied in step a) in the region of the previously applied layer corresponding to the at least part of the cross section of the at least one three-dimensional object;
   repeating steps a) and b) until all cross sections of the at least one three-dimensional object are solidified; and
   prior to application of the layer in step a), determining a maximum extension of a solidified region in the previously applied layer in a movement direction of the recoater based on a thickness of the solidified region prior to solidification, and calculating a product of the thickness of the solidified region prior to solidification and the maximum extension,
   wherein during the application of the layer in step a), at least an additional powder amount proportional to the product is provided in addition to a powder amount required for a layer having the predetermined thickness, and
   wherein determining the maximum extension further comprises:
     performing a computer-aided segmentation of the solidified region of the previously applied layer into n strips, wherein n>1 is valid and the strips extend in the movement direction of the recoater; and
     determining an extension of each strip i in the movement direction of the recoater, wherein 1<i<n is valid,
     wherein a maximum value of an extension of the strips in the movement direction of the recoater is taken as the maximum extension, and the additional powder amount proportional to this maximum extension is provided for each of the n strips.

2. The method according to claim 1, further comprising accessing a computer-based model of the at least one three-dimensional object to be manufactured for determining the product of the thickness and the maximum extension.

3. The method according to claim 1,
   wherein in step a) the layer having the predetermined thickness is applied onto the previously applied layer of the building material possessing k solidified regions having k different layer thicknesses dj, wherein 1≤j≤k is valid and k is a natural number greater than 1; and
   wherein, for each strip, products of extensions of solidified regions j in a respective strip in the movement direction of the recoater and a corresponding layer thicknesses dj are summarized, and a maximum of strip-wise values determined in this manner is used as the product.

4. The method according to claim 1, wherein a solidified region having a specific thickness in the movement direction of the recoater includes discontinuous partial regions in the movement direction of the recoater, and further comprising summarizing extensions of the discontinuous partial regions in the movement direction of the recoater.

5. The method according to claim 1, further comprising selecting a volume of the additional powder amount to be at least as large as a product of the maximum extension, a powder compaction factor, and an extension of the previously applied layer perpendicularly to the movement direction of the recoater,
wherein the powder compaction factor describes a percentage shrinking of a layer thickness of the building material during the solidification and is determined by empiric preliminary tests for used building material in powder form.

6. The method of claim 1, wherein step a) includes providing a metering device that includes powder feeding devices adjacently arranged perpendicularly to the movement direction of the recoater.

7. The method according to claim 6, wherein the powder feeding devices are configured to feed volumes of the building material in powder form different from one another in a direction perpendicular to the movement direction for the application of the layer by the recoater.

8. The method according to claim 6, wherein feeding of the building material is switchable on and/or off in at least one of the powder feeding devices during a movement of the recoater.

9. The method according to claim 6, wherein at least one of the powder feeding devices is subdivided into partial chambers in the movement direction of the recoater and the building material in powder form can be respectively selectively fed from one of the partial chambers.

10. The method according to claim 9, wherein a powder feeding device subdivided into partial chambers in the movement direction of the recoater is configured such that, by a movement of the powder feeding device, a bottom of each of the partial chambers is positionable above an outlet opening provided in the recoater, through which the building material is fed to the build area during step a).

11. The method according to claim 10, wherein the powder feeding devices are movable together.

12. The method according to claim 9, wherein an outlet opening provided in the recoater is subdivided into a plurality of outlet openings adjacently arranged perpendicularly to the movement direction.

13. The method according to claim 10, wherein the movement of a powder feeding device for positioning bottoms of the partial chambers above the outlet opening of the recoater is implemented by a pivoting of the powder feeding device about a pivot axis extending perpendicularly to the movement direction of the recoater.

14. The method according to claim 10, wherein the movement of a powder feeding device for positioning bottoms of the partial chambers above the outlet opening of the recoater is implemented by moving the powder feeding device parallel to the movement direction of the recoater.

15. The method of claim 1, further comprising providing a powder demand determination unit for determining building material demand during manufacturing of the at least one three-dimensional object in the build area by the successive layer-by-layer solidification of the building material in powder form, wherein the powder demand determination unit comprises:
a layer data input unit,
a powder amount determination unit configured to:
determine the product from data of a partially solidified powder layer having a thickness received via the layer data input unit and direction information including the movement direction of the recoater in a manufacturing device for manufacturing the at least one three-dimensional object by successive layer-by-layer solidification of the building material in powder form; and
determine the additional powder amount, and
an additional powder amount output unit.

16. The method according to claim 1 performed by a control unit that controls a manufacturing device for manufacturing the at least one three-dimensional object by the successive layer-by-layer solidification of the building material in powder form within the build area, comprising:
the recoater movable across the build area for applying the layer of the building material having the predetermined thickness onto the previously applied layer which has been solidified in the region corresponding to at least a part of the cross section of the at least one three-dimensional object;
a metering device which is suitable to provide an amount of the building material in powder form required for the application of the layer having the thickness by the recoater;
a solidification device for performing the step of solidifying; and
a control unit for controlling the recoater, the metering device, and the solidification device,
wherein the control unit is configured to determine, prior to controlling or driving the recoater for the application of the layer, the product of the maximum extension of a solidified region having the thickness in the previously applied layer in movement direction of the recoater and a layer thickness d1, wherein d1 is the layer thickness prior to the solidification.

17. The method according to claim 16,
wherein, for determining the product, the control unit performs a computer-aided segmentation of the region of the previously applied layer to be over-coated by the recoater into n strips, wherein n>1 is valid and the strips extend in movement direction of the recoater; and
wherein respectively one or more strips are allocated to a powder feeding device and an extension of the strips allocated to a powder feeding device perpendicularly to the movement direction of the recoater is equal to an extension of this powder feeding device perpendicularly to the movement direction of the recoater.

18. A non-transitory computer-readable medium that stores a computer program which, when executed, controls a device for manufacturing the at least one three-dimensional object by the successive layer-by-layer solidification of the building material in powder form such that the device performs the method according to claim 1.

19. A method of manufacturing at least one three-dimensional object in a build area by selective layer-wise solidification of a building material in powder form, the method comprising:
moving a recoater in a movement direction across the build area to apply a first layer of the building material in powder form, the first layer having a first thickness; and
selectively solidifying the first layer at positions that correspond to a cross-section of the at least one three-dimensional object in the first layer to obtain a first solidified region;
determining a first extension of the first solidified region that is a maximum dimension of the first solidified region in the movement direction of the recoater;
determining a value of a product of the first extension and the first thickness; and providing an additional powder amount for a second layer of the building material in powder form to be applied onto the first layer, the additional powder amount being proportional to the value of the product, wherein determining the maximum dimension further comprises:

performing a computer-aided segmentation of the first solidified region of the first layer into n strips, wherein n>1 is valid and the strips extend in the movement direction of the recoater; and determining an extension of each strip i in the movement direction of the recoater, wherein $1 \leq i \leq n$ is valid, wherein a maximum value of extensions of the strips in the movement direction of the recoater is taken as the maximum dimension, and the additional powder amount proportional to this maximum dimension is provided for each of the n strips.

* * * * *